US006857987B2

(12) United States Patent
Aldrich, III et al.

(10) Patent No.: US 6,857,987 B2
(45) Date of Patent: Feb. 22, 2005

(54) TRANSMISSION LOAD MODELING FOR ENGINE IDLE SPEED CONTROL

(75) Inventors: William L. Aldrich, III, Davisburg, MI (US); Glenn P. O'Connell, Troy, MI (US); Michael L. Velliky, Fenton, MI (US); Leonard G. Wozniak, Ann Arbor, MI (US); Richard E. Parsons Jr., Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/624,250

(22) Filed: Jul. 22, 2003

(65) Prior Publication Data

US 2005/0020406 A1 Jan. 27, 2005

(51) Int. Cl.[7] .................................................. B60K 41/04
(52) U.S. Cl. .................................. 477/110; 123/339.16
(58) Field of Search ....................... 123/339.16, 339.19, 123/339.15; 477/110

(56) References Cited

U.S. PATENT DOCUMENTS

| | | | | |
|---|---|---|---|---|
| 4,879,982 A | * 11/1989 | Itakura et al. | .............. | 477/111 |
| 5,253,623 A | * 10/1993 | Melnyk et al. | ........ | 123/339.11 |
| 6,513,489 B2 | * 2/2003 | Osanai | .................. | 123/339.11 |

* cited by examiner

*Primary Examiner*—Dirk Wright
(74) *Attorney, Agent, or Firm*—Christopher DeVries

(57) ABSTRACT

An idle speed compensation system for a vehicle includes an idle speed control system that varies airflow to an engine at idle and a transmission driven by the engine. A controller communicates with the idle speed control system, the engine, and the transmission. The controller generates an idle speed compensation signal based on a transmission load.

26 Claims, 2 Drawing Sheets

TRANSMISSION LOAD MODELING FOR ENGINE IDLE SPEED CONTROL

FIELD OF THE INVENTION

The present invention relates to idle speed control, and more particularly to using a transmission load estimate to improve idle speed control.

BACKGROUND OF THE INVENTION

Besides driving a powertrain, an engine of a vehicle provides power to various auxiliary components. These components typically include an alternator that recharges a battery, an A/C compressor for an A/C system, and/or a hydraulic pump that provides pressurized hydraulic fluid. Powering each of these auxiliary components reduces the torque output of the engine. During idle, the reduced torque output may cause noticeable fluctuation of engine idle speed.

Traditionally, controllers use spark retard and idle air control to reduce engine idle speed fluctuations. Both methods, however, have disadvantages. Spark retard causes inefficient engine operation during idle. Idle air control enables only gross tuning of the engine idle speed.

Some of the auxiliary components such as the alternator and A/C compressor provide feedback signals to an engine controller, which compensates for these loads. Other auxiliary components such as the hydraulic pump do not provide feedback signals to the engine controller. When the transmission load requires increased hydraulic pressure, the hydraulic pump increases the load on the engine, which fluctuates engine idle speed. Compensation does not occur until some time after the fluctuation occurs.

SUMMARY OF THE INVENTION

An idle speed compensation system according to the present invention for a vehicle includes an idle speed control system that varies airflow to an engine at idle and a transmission driven by the engine. A controller communicates with the idle speed control system, the engine, and the transmission. The controller generates an idle speed compensation signal based on a transmission load.

In one feature, the controller operates the idle speed control system based on the idle speed compensation signal.

In another feature, an engine speed sensor communicates with the controller. The engine speed sensor provides an engine speed signal. The controller generates the idle speed compensation signal based on the engine speed signal.

In yet another feature, the transmission load is based on a transmission line pressure.

In still another feature, a transmission fault sensor communicates with the controller. When the transmission fault sensor senses a fault, the controller generates the idle compensation signal from a look-up table based on engine speed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
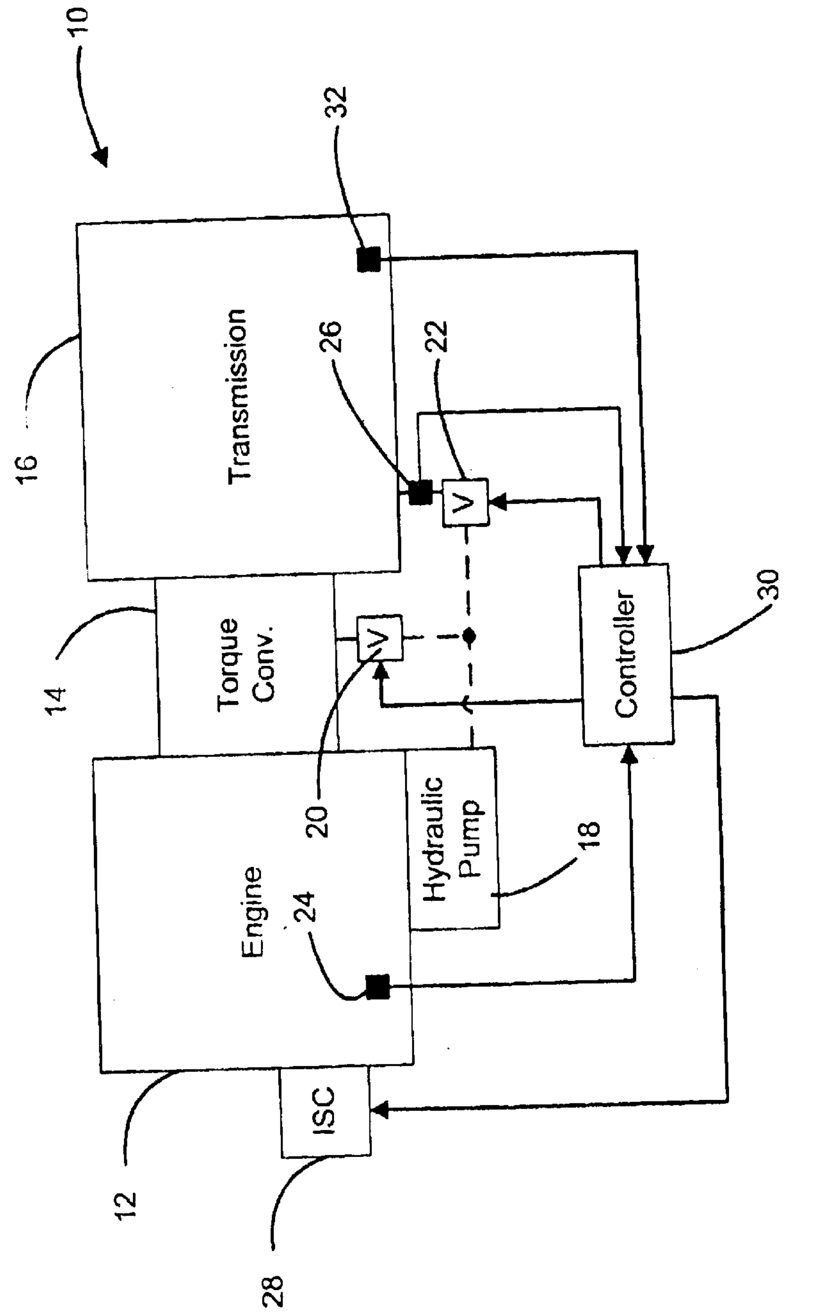
FIG. 1 is a functional block diagram of a vehicle including an idle speed control system according to the present invention.

The following description of the preferred embodiment is merely exemplary in nature and is in no way intended to limit the invention, its application, or uses. For purposes of clarity, the same reference numbers will be used in the drawings to identify similar elements.

Referring now to FIG. 1, a vehicle 10 includes an engine 12, a torque converter 14, and an automatic transmission 16. The engine 12 drives the transmission 16 through the torque converter 14. A hydraulic pump 18 is driven by the engine 12 to provide pressurized fluid to the torque converter 14 and the transmission 16 through solenoid valves 20 and 22, respectively. Although not shown in the Figures it is anticipated that in an alternative configuration the hydraulic pump 18 can be part of the transmission 16. In this configuration, the hydraulic pump 18 is driven at engine speed by the torque converter 14.

An engine speed sensor 24 senses a rotational speed or revolutions per minute (RPMs) of the engine 12. A pressure sensor 26 senses the hydraulic pressure to the transmission 16. The hydraulic pressure is indicative of the load of the hydraulic pump 18 on the engine. Alternatively, however, expected engine load of the hydraulic pump 18 can be calculated based on engine speed and the control signals to the solenoid valves 20, 22.

An idle speed control (ISC) system 28 regulates the idle speed of the engine 12 by manipulating air flow into the engine 12. It is anticipated that the ISC system 28 can be an idle air control (IAC) system. Conventional IAC systems include an inlet and valve (not shown), which are driven by a stepper motor. The IAC system bypasses a throttle (not shown), which is normally operated by an accelerator pedal (not shown), to provide air to the engine 12. More specifically, counts of the stepper motor are adjusted to control a position of the valve in the IAC system. Adjusting the valve increases or decreases air flow into an intake manifold (not shown). As idle speed decreases below a desired level, the IAC system opens the valve to increase the idle speed. As the idle speed increases above a desired level, the IAC system closes the valve to decrease the idle speed. The IAC system ensures that sufficient air flows into the engine 12 to compensate for variable engine load during idle. Alternatively, however, the ISC system 28 can be an electronic throttle control (ETC) system. The ETC system manipulates a throttle (not shown) to control engine idle speed.

A controller 30 communicates with the ISC system 28, the engine speed sensor 24, the solenoid valves 20, 22, and the pressure sensor 26. In the case of an ETC system, the controller 30 communicates with the ETC system to adjust the engine idle speed. The controller 30 operates the solenoid valves 20, 22 at first and second duty cycles to provide hydraulic fluid pressure to the torque converter 14 and the transmission 16. The controller 30 communicates with a transmission sensor system 32 to identify faults. The transmission sensor system 32 may include a line pressure fault, a communication fault and/or other faults. The pressure sensor 26 generates a load signal related to actual transmission load. The controller 30 processes the load signal to determine a transmission load and a proportional idle speed compensation signal. In one embodiment, the controller 30 references a look-up table based on the load signal.

Alternatively, the controller 30 uses a desired transmission load signal to determine the idle speed compensation signal. More specifically, the controller 30 determines the desired transmission load based on engine speed, throttle position, and a present transmission load. The controller 30 determines the hydraulic pump output that is required to achieve the desired transmission load. The desired transmission load signal is based on the required transmission load capacity. By using the desired transmission load signal, proactive idle speed compensation can be performed since actual transmission load lags behind the desired transmission load signal.

Although a single controller 30 is discussed in detail herein, it is anticipated that the controller 30 can include an engine control module (ECM) and a transmission control module (TCM). The ECM and TCM (not shown) communicate via a serial data link (SDL). In this case, the ECM communicates with the engine speed sensor 24 and the ISC system 28 or ETC system. The TCM communicates with the solenoid valves 20, 22, the pressure sensor 26, and the transmission sensor system 32.

Figure 2:
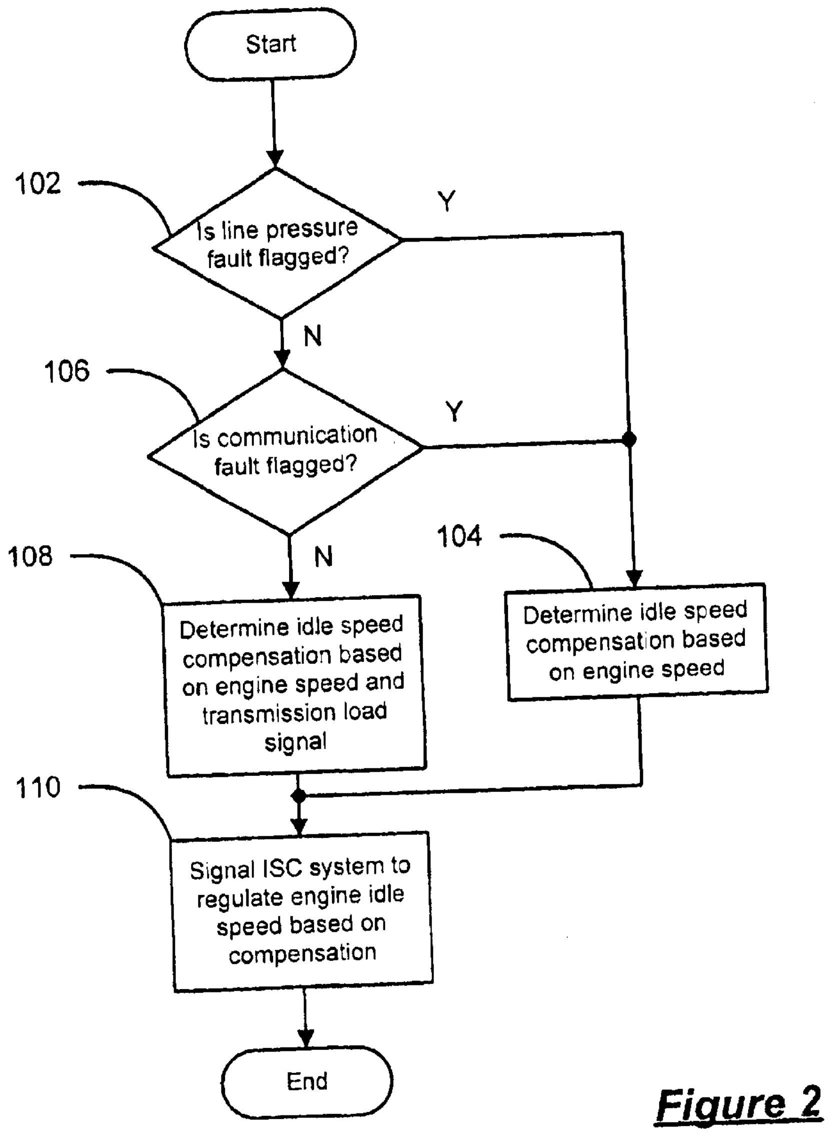
FIG. 2 is a flowchart illustrating steps of an idle speed control method according to the present invention.

Referring now to FIG. 2, the controller 30 determines whether a line pressure fault is flagged in step 102. If a line pressure fault has been flagged, the controller 30 continues with step 104. If not, the controller 30 continues with step 106 and determines whether a communication fault has been flagged. If a communication fault has been flagged, the controller 30 continues with step 104. If not, the controller 30 continues with step 108.

In step 104, the controller 30 determines an idle speed compensation signal from a look-up table. The idle speed compensation signal is a calibration variable that is based on engine idle speed. Once the idle speed compensation signal has been determined, the ISC system 28 regulates the engine idle speed in accordance with the idle speed compensation signal in step 110 and control ends.

In step 108, the controller 30 calculates an idle speed compensation signal based on engine speed and transmission load. As discussed in detail above, the transmission load signal is indicative of either an actual transmission load or a desired transmission load. The transmission load signal is a protocol message that is recognized by the controller and multiplied by a corresponding scaling factor to provide the hydraulic line pressure. The idle speed compensation signal is determined from a look-up table, an example of which is provided in the following table.

TABLE 1

| Engine Speed | Idle Speed Compensation Signal Line Pressure Signal (kPa) | | | | |
|---|---|---|---|---|---|
| (RPM) | 0 | 2048 | 4096 | 6144 | 8192 |
| 0 | 5.1 | 20 | 30 | 40 | 50 |
| 800 | 1.4 | 12 | 20.7 | 30 | 40 |
| 1600 | 0 | 5.8 | 12.5 | 20 | 30 |
| 2400 | 0 | 0 | 5 | 10 | 17.6 |
| 3200 | 0 | 0 | 0 | 0 | 0 |

It will be appreciated that the signals provided in the exemplary look-up table may vary based on factors including engine and transmission configurations.

Using the look-up table, the controller 30 performs linear interpolation to generate the idle speed compensation signal. The idle speed compensation signal is equal to a count increase for the stepper motor of the ISC 28. For example, if the engine speed is equal to 800 RPM and the line pressure signal is equal to 2048 kPa, the stepper motor count is increased by 12. In step 110, the ISC system 28 regulates the engine idle speed in accordance with the idle speed compensation signal and control ends.

The present invention provides engine idle speed compensation for transmission load. As a result, intrusive idle speed control via spark retard is minimized and a reduced burden is placed on the ISC system 28. In this manner, engine stability at idle is maintained by the ISC system 28.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An idle speed compensation system for a vehicle including an engine comprising:

an idle speed control system that varies airflow to said engine at idle;

a transmission driven by said engine; and a controller that communicates with said idle speed control system, said engine, and said transmission and that generates an idle speed compensation signal based on a transmission load, which is based on a transmission line pressure.

2. The idle speed compensation system of claim 1 wherein said controller operates said idle speed control system based on said idle speed compensation signal.

3. The idle speed compensation system of claim 1 further comprising an engine speed sensor that communicates with said controller and that provides an engine speed signal, wherein said controller generates said idle speed compensation signal based on said engine speed signal.

4. The idle speed compensation system of claim 1 wherein said idle speed control system is an idle air controller.

5. The idle speed compensation system of claim 1 wherein said idle speed control system is an electronic throttle controller.

6. The idle speed compensation system of claim 1 wherein said transmission load is based on a measured transmission line pressure.

7. The idle speed compensation system of claim 1 wherein said controller generates said idle speed compensation signal from a look-up table.

8. The idle speed compensation system of claim 1 further comprising a transmission fault sensor that communicates with said controller.

9. The idle speed compensation system of claim 8 wherein when said transmission fault sensor senses a fault, said controller generates said idle compensation signal from a look-up table based on engine speed.

10. The idle speed compensation system of claim 9 wherein said fault is a transmission line pressure fault.

11. The idle speed compensation system of claim 9 wherein said fault is a transmission communication fault.

12. A method of adjusting engine idle speed comprising:

determining a transmission load based on a transmission line pressure;

sending a transmission load signal that is generated based on said transmission line pressure to a controller; and compensating an idle speed of an engine based upon said transmission load signal.

13. The method of claim 12 wherein said transmission load is based on a measured transmission line pressure.

14. The method of claim 12 wherein said transmission load is based on a commanded transmission line pressure.

15. The method of claim 12 further comprising sending a compensation signal based on said transmission load signal and an engine speed to an idle speed control system of said engine.

16. The method of claim 15 wherein said compensation signal is determined from a look-up table based on said transmission load signal.

17. The method of claim 15 wherein said idle speed control system is an idle air controller.

18. The method of claim 15 wherein said idle speed control system is an electronic throttle controller.

19. A method of compensating engine idle speed comprising:

determining a transmission load based on a transmission line pressure;

determining an engine idle speed;

determining an idle speed compensation signal based on at least one of said transmission load and said engine idle speed; and compensating said engine idle speed based upon said idle compensation signal.

20. The method of claim 19 wherein a look-up table is used to determine said idle compensation signal.

21. The method of claim 19 further comprising:

determining whether a transmission fault is present; and using a compensation calibration signal based upon said engine idle speed to determine said idle compensation signal if said transmission fault is present.

22. The method of claim 21 wherein said transmission fault is a line pressure fault.

23. The method of claim 21 wherein said transmission fault is a transmission communication fault.

24. The method of claim 21 wherein said compensation calibration signal is determined from a look-up table.

25. The method of claim 19 wherein said transmission load is based on an actual transmission line pressure.

26. The method of claim 19 wherein said transmission load is based on a commanded transmission line pressure.

* * * * *